(12) United States Patent
Ketterl et al.

(10) Patent No.: US 9,394,978 B2
(45) Date of Patent: Jul. 19, 2016

(54) METHOD FOR PRODUCING A TENSIONING OR GUIDE RAIL WITH A VIBRATION ABSORBER

(71) Applicant: iwis motorsysteme GmbH & Co. KG, Munich (DE)

(72) Inventors: Sandra Ketterl, Moosinning/Eichenried (DE); Pia Gruler, Kempfenhausen (DE); Michael Weikert, Neufinsing (DE); Ralph Schneider, Penzberg (DE)

(73) Assignee: IWIS MOTORSYSTEME GMBH & CO. KG, Munich (DE)

( * ) Notice: Subject to any disclaimer, the term of this patent is extended or adjusted under 35 U.S.C. 154(b) by 49 days.

(21) Appl. No.: 14/201,646

(22) Filed: Mar. 7, 2014

(65) Prior Publication Data

US 2014/0256487 A1 Sep. 11, 2014

(30) Foreign Application Priority Data

Mar. 7, 2013 (DE) .......................... 10 2013 003 948

(51) Int. Cl.
*F16H 7/08* (2006.01)
*F16H 7/18* (2006.01)
*B29C 45/14* (2006.01)

(52) U.S. Cl.
CPC . *F16H 7/18* (2013.01); *B29C 45/14* (2013.01); *F16H 2007/0872* (2013.01)

(58) Field of Classification Search
CPC ..... F16H 2007/0872; F16H 7/18; F16H 7/08; F16H 2007/0893; F16H 2007/0804
USPC .................................................. 474/111, 140
See application file for complete search history.

(56) References Cited

U.S. PATENT DOCUMENTS

| 2,766,634 | A | * | 10/1956 | Frank | F16F 7/00 474/140 |
| 4,826,468 | A | * | 5/1989 | Friedrichs | F16H 7/08 474/101 |
| 5,045,032 | A | * | 9/1991 | Suzuki | F16H 7/08 474/140 |
| 5,222,917 | A | * | 6/1993 | Shimaya | F16H 7/08 474/101 |
| 5,318,482 | A | * | 6/1994 | Sato | F16H 7/08 474/111 |
| 6,036,613 | A | * | 3/2000 | Diehm | F01L 1/02 474/111 |
| 6,062,998 | A | * | 5/2000 | Kumakura | F16H 7/18 474/110 |
| 6,890,277 | B2 | * | 5/2005 | Inoue | F16H 7/18 474/111 |
| 7,326,138 | B2 | * | 2/2008 | Konno | F16H 7/18 474/111 |
| 7,329,196 | B2 | * | 2/2008 | Konno | F16H 7/18 474/111 |
| 8,052,558 | B2 | * | 11/2011 | Markley | F16H 7/0848 474/111 |
| 8,308,588 | B2 | * | 11/2012 | Hewitt | F16H 7/18 474/111 |
| 8,740,737 | B2 | * | 6/2014 | Konno | F16H 7/18 474/111 |
| 8,900,079 | B2 | * | 12/2014 | Mori | F16H 7/18 474/111 |
| 8,961,342 | B2 | * | 2/2015 | Emura | B62M 9/136 474/140 |

(Continued)

FOREIGN PATENT DOCUMENTS

CN 201934160 U 8/2011
CN 102345647 A 2/2012

(Continued)

*Primary Examiner* — Henry Liu
(74) *Attorney, Agent, or Firm* — Baker and Hostetler LLP

(57) ABSTRACT

A method for producing a tensioning or guide rail with a base body, and a vibration absorber arranged on the base body is provided, comprising the steps of: providing a base body, at least partially embedding the base body into plastic material that is in a flowable state, and hardening the plastic material to obtain a vibration absorber that is captively arranged on the base body. The method also relates to a respective rail and to a continuous drive for a combustion engine.

10 Claims, 6 Drawing Sheets

(56) References Cited

U.S. PATENT DOCUMENTS

| | | | |
|---|---|---|---|
| 2002/0042315 A1* | 4/2002 | Poiret | F16H 7/08 474/111 |
| 2002/0042316 A1* | 4/2002 | Young, Jr. | B62J 13/00 474/140 |
| 2002/0119848 A1* | 8/2002 | Tada | F16H 7/0829 474/111 |
| 2002/0193192 A1* | 12/2002 | Inoue | F16H 7/18 474/111 |
| 2003/0050140 A1* | 3/2003 | Konno | F16H 7/18 474/111 |
| 2003/0078122 A1* | 4/2003 | Kawano | F16H 7/18 474/111 |
| 2004/0058761 A1* | 3/2004 | Konno | F16H 7/08 474/111 |
| 2004/0058763 A1* | 3/2004 | Konno | F16H 7/08 474/111 |
| 2004/0147350 A1* | 7/2004 | Kurohata | F16H 7/18 474/111 |
| 2005/0096167 A1* | 5/2005 | Konno | F16H 7/18 474/111 |
| 2005/0107196 A1* | 5/2005 | Konno | F16H 7/18 474/111 |
| 2005/0159260 A1* | 7/2005 | Gogo | B62J 13/00 474/111 |
| 2005/0239590 A1* | 10/2005 | Foster | B65G 21/22 474/140 |
| 2006/0100047 A1* | 5/2006 | Churchill | F16H 7/18 474/109 |
| 2006/0199689 A1* | 9/2006 | Yoshimoto | F16H 7/18 474/111 |
| 2007/0155555 A1* | 7/2007 | Fukata | B29C 45/1642 474/111 |
| 2008/0032836 A1* | 2/2008 | Konno | F16H 7/18 474/140 |
| 2009/0057488 A1 | 3/2009 | Goldfinch et al. | |
| 2009/0069133 A1* | 3/2009 | Smart | F16H 7/0831 474/111 |
| 2009/0275430 A1* | 11/2009 | Markley | F16H 7/0848 474/111 |
| 2010/0203991 A1* | 8/2010 | He | F16H 7/18 474/111 |
| 2012/0129636 A1* | 5/2012 | Lee | F16H 7/18 474/111 |
| 2013/0035184 A1* | 2/2013 | Konno | F16H 7/18 474/111 |
| 2013/0053195 A1* | 2/2013 | Emura | B62M 9/16 474/140 |
| 2013/0053197 A1* | 2/2013 | Konno | F16H 7/18 474/140 |
| 2013/0090201 A1* | 4/2013 | Mori | F16H 7/18 474/140 |
| 2014/0148288 A1* | 5/2014 | Miyazawa | F16H 7/18 474/140 |
| 2014/0213401 A1* | 7/2014 | Konno | F16H 7/18 474/140 |

FOREIGN PATENT DOCUMENTS

| | | |
|---|---|---|
| DE | 29905965 U1 | 9/1999 |
| DE | 19856705 A1 | 6/2000 |
| DE | 102004013207 A1 | 10/2005 |
| DE | 102011017769 A1 | 10/2012 |
| EP | 2505876 A1 | 10/2012 |

* cited by examiner

METHOD FOR PRODUCING A TENSIONING OR GUIDE RAIL WITH A VIBRATION ABSORBER

CROSS-REFERENCE TO RELATED APPLICATION

This application claims priority to foreign German patent application No. DE 102013003948.7, filed on Mar. 7, 2013, the disclosure of which is incorporated by reference in its entirety.

FIELD OF THE INVENTION

The present invention relates to a method for producing a tensioning or guide rail with a base body and a vibration absorber arranged on the base body and a tensioning or guide rail with such a vibration absorber and a continuous drive applying the latter.

BACKGROUND

A tensioning or guide rail is known from DE 102011017769 A1 in which a vibration absorber is disposed below the sliding coat. The vibration absorber comprises an elastomer layer and at least one absorber mass coupled to the elastomer layer. The vibration absorber is designed as a spring-mass system. The vibration absorber comprises such a soft connection to the rail that the mass of the absorber follows the movement of the rail with a certain delay. During vibration of the rail, the connection is stretched and compressed, the associated energy consumption is eliminated from the vibration and thereby acts in an absorbing manner. The vibration absorber is usually designed such that its own frequency is in a certain relation to the vibration frequency of the rail to be eliminated. At this optimized frequency, the vibration absorber withdraws vibration energy from the rail for its own vibratory motions.

Tensioning or guide rails are often employed in highly dynamic chain drives in internal combustion engines, such as timing chain drives. Vibrations in this system can lead to undesired noise and loads, for which reason vibration damping is of great importance. Although the document cited discusses a principle for vibration absorption, it does not, however, provide any specific design that can be employed in practice, for example, in a highly dynamic chain drive.

SUMMARY OF THE INVENTION

It is therefore the object of the present invention to provide a method for producing a tensioning or guide rail that enables an arrangement applicable in practice of a vibration absorber on a base body of the rail.

This object is satisfied according to the invention by the following method steps:

providing a base body, at least partially embedding the base body into plastic material that is in a flowable state, and hardening the plastic material to obtain a vibration absorber that is captively arranged on the base body.

The vibration absorber itself is therefore at least partly made of plastic material which is used for at least partially embedding the base body. This results in closely joining the vibration absorber with the base body. Due to the flow capability and thus the ease of forming the plastic material, the most diverse attachment variants can be used, so that, in particular, positive-fit engagement of a captive connection can be achieved.

According to a further development, it is for this not mandatory that the vibration absorber or its plastic material, respectively, and the base body engage in a direct connection, e.g. in the form of an adhesive bond with one another, but primarily a positive-fit connection. It is for operation of the vibration absorber entirely sufficient for developing its dampening effect if it exhibits sufficient proximity relative to the base body and is accordingly captively arranged. Any adhesion of plastic material onto the base body is not absolutely necessary for this. According to one embodiment, it is for this reason provided that at least the portions of the base body abutting on the vibration absorber are made of material that does not enter into any adhesive connection with the plastic material of the vibration absorber when hardening, or at most one that can be eliminated by operation as a vibration absorber. In this, the combination of materials is crucial, whether they enter into an adhesive connection during embedding and hardening or not. An adhesive connection can in part not be entirely avoided during the manufacturing process. It can therefore suffice for the operation as a vibration absorber presently desired if an initially existing adhesive connection is during operation broken as soon as possible, is in particular eliminated after a few vibration excitations. This means that the crucial method of connection is the positive fit because initial adhesion is of no relevance.

A further embodiment provides that the plastic material for the vibration absorber is a thermoplastic elastomer (TPE), in particular a TPE based on styrene block copolymers. Such thermoplastic elastomers that can be applied and attached by injection-molding are widely used as coating materials for haptic improvement of devices. Unlike rubber or rubber-like thermoset materials also frequently being used, thermoplastic elastomers can be processed by injection-molding and can after curing also be re-used. The thermoplastic elastomer should preferably be combined with a base body which is at least in the regions abutting on the vibration absorber made of material that does not enter any direct adhesive connection with the thermoplastic elastomer, or only a very weak one. For example, a polyamide can presently be employed, in particular PA66. Depending on the objective, however, also steel or aluminum can be used as base body material.

According to one variant, the base body is preferably produced from plastic in one injection-molding process and subsequently the step of embedding is performed in a further injection-molding process. Injection-molding technology is a well-established manufacturing method. Existing machines can be employed using suitable tool molds for directly producing the tensioning or guide rail with the vibration absorber.

Furthermore, at least one connection point can be formed on the base body which with the step of embedding and hardening enters into a positive-fit connection with the vibration absorber. It is usually sufficient for the positive-fit connection if several of these connection points are provided distributed at predetermined distances along the rail, while the remainder of the vibration absorber abuts the base body and does not have to be additionally secured beyond the connection points.

According to one embodiment, the connection points can comprise at least one opening, one recess and/or one outwardly open cavity respectively comprising at least one undercut, and where the at least one opening, one recess and/or the at least one outwardly open cavity including the at least one undercut is or are during the step of embedding at least in part filled with the plastic material. In the simplest case, the base body comprises an opening so that the plastic material of the vibration absorber extends through the opening or openings and thereby the plastic portions of the vibration absorber located on opposite sides of the base body are joined with each other. The vibration absorber, however, does not necessarily need to be integrally formed, for which reason, for example, also recesses separated from each other or outwardly open cavities can be provided that are at least partially filled with the plastic material. In this manner, portions of the vibration absorber can also be created that have a different weight and thereby develop their effect in an enhanced manner possibly also at different frequencies. It should additionally be noted that the vibration absorber does not need to be exclusively formed by the plastic material. The plastic material can also include fillers that can serve, firstly, reinforcement purposes or, secondly, weight increase (increase of the absorption mass). It is also possible to embed additional mass bodies into the plastic material which then become part of the vibration absorber and are due to the preferably elastic plastic material arranged as a vibrating absorption mass.

Furthermore, the invention relates to a tensioning or guide rail with a base body and a vibration absorber disposed on the base body, where the base body comprises at least one receiving portion in which a vibration absorber is arranged in a positive-fit manner. The tensioning or guide rail is characterized in particular by the fact that at least portions of the vibration absorber abutting on the base body are made of an injection-molded thermoplastic elastomer (TPE). Such an arrangement of the vibration absorber has significant advantages and allows a plurality of options for creating a positive-fit connection between these elements. In particular if the base body and the vibration absorber enter a primarily positive-fit connection and no direct, in particular adhesive connection being irrelevant for the function, an additional option is given that, for example, with a chain drive, lubricating oil enters the regions between the vibration absorber and the base body and there develops its effect, for example, dampening effect. It is not absolutely necessary that e.g. a gap be formed between the vibration absorber and the base body e.g. due to shrinkage processes during hardening of the plastic material. Instead, exactly the opposite can be given, that the plastic material of the vibration absorber in the resting state abuts the base body or is slightly pressed against it. However, due to the vibrations arising, the vibration absorber usually at least partially lifts off from the base body, whereby hydraulic oil or lubricating oil can enter these regions and have influence on the effect of the vibration absorber.

Preferably, the base body can comprise a slide track and a support portion arranged therebeneath, where the support portion by itself or together with the slide track form a rail frame inside which a rail wall, extending substantially perpendicular to the slide track and being recessed relative to the rail frame, is arranged in which or by which the connection points are disposed or formed, respectively. The term "slide track" is to be understood in a broad manner. A slide coat body can additionally be attached to the base body (clipped on, sprayed on, etc.). Therefore, slide track is also understood to be that region of the base body on which such slide coat body is applied. The use of a rail frame and a rail wall with connection points creates recesses at least on one side of the rail wall (in particular if the rail wall is thinner than the rail frame) in which plastic material can be disposed without protruding beyond the rail frame. This plastic material is then connected to the base body at the connecting points being used in appropriate number. The rail wall can also be designed flush with a side surface of the rail frame so that the vibration absorber is disposed mainly on one side of the rail wall. It would also be conceivable to provide rail wall sections on both sides of the rail frame which are arranged offset from each other in the longitudinal direction so that the vibration absorber is arranged between the rail wall sections.

Furthermore, it can for this be provided that openings are arranged spaced apart as connection points in the rail wall which at least in part are each faced by bridge webs extending from one side of the rail frame to the other, each at a distance to the rail wall, so that portions of the vibration absorber are disposed between the bridge webs and the rail wall.

The plastic material of the vibration absorber is disposed on at least one side wall of the rail wall between the rail wall and the bridge webs that are used in appropriate number to additionally support the vibration absorber towards the outside. Provided that the rail wall is centrally arranged and that portions of the vibration absorber are located both on the one as well as on the other side, the bridge webs can also be arranged on both one as well as the other side or alternatingly to the rail wall, respectively.

Preferably, the rail frame can be filled with the plastic material of the vibration absorber while entirely or partially embedding the rail wall and/or the bridge webs. In the most advantageous case, this creates a substantially smooth side surface of the rail which is formed jointly by portions of the vibration absorber and the base body. In addition, such a design is relatively uncomplicated to manufacture by injection-molding.

According to a preferred embodiment, the plastic material of the vibration absorber can be a TPE based on styrene block copolymers, preferably styrene-ethylene-butylene-styrene (SEBS).

Furthermore, the portions of the base body abutting on the vibration absorber can be made of plastic material, preferably polyamide, in particular PA 66. The base body is advantageously made of a high-strength plastic that is suitable for the extreme conditions, in particular, of a timing chain drive. PA66, for example, is such plastic material. In the variant in which the plastic material of the vibration absorber is a TPE, in particular a TPE based on SEBS, it additionally does not or only negligibly enter into an adhesive connection with the base body.

Furthermore, the invention relates to a continuous drive for an internal combustion engine comprising a drive gear, at least one driven gear, a continuous drive device, such as a chain or belt, coupling the drive gear with the at least one driven gear, and a tensioning or guide rail abutting on the continuous drive device according to one of the claims 8 to 13.

BRIEF DESCRIPTION OF THE DRAWINGS

Embodiments of the present invention are explained in more detail below with reference to drawings.

DETAILED DESCRIPTION

Figure 1:
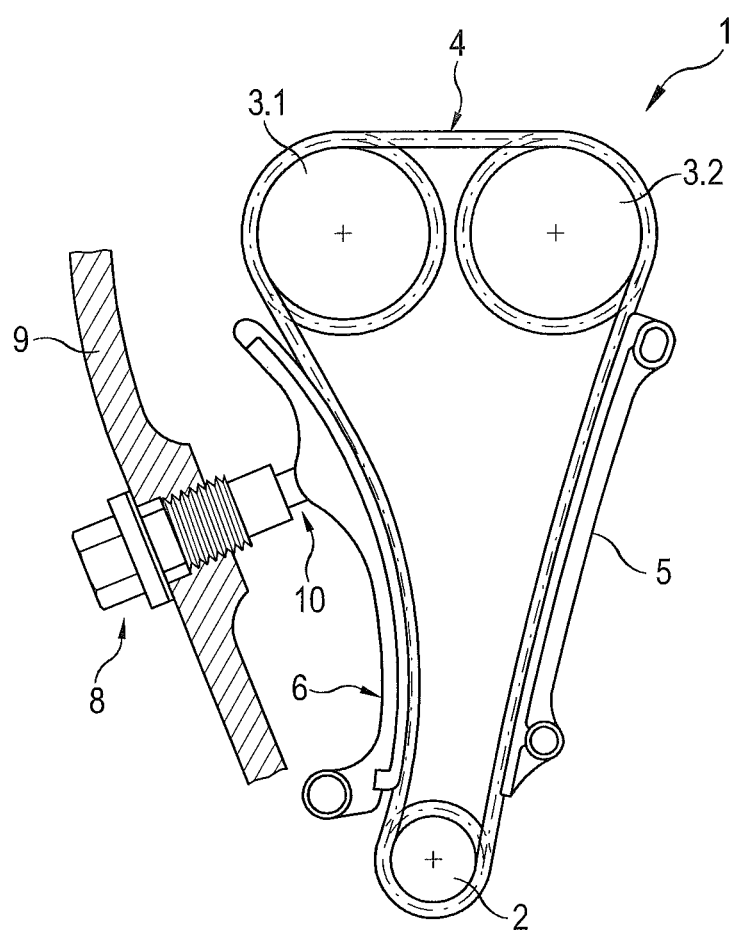
FIG. 1 shows a timing chain drive in a schematic front view.
Figure 2:
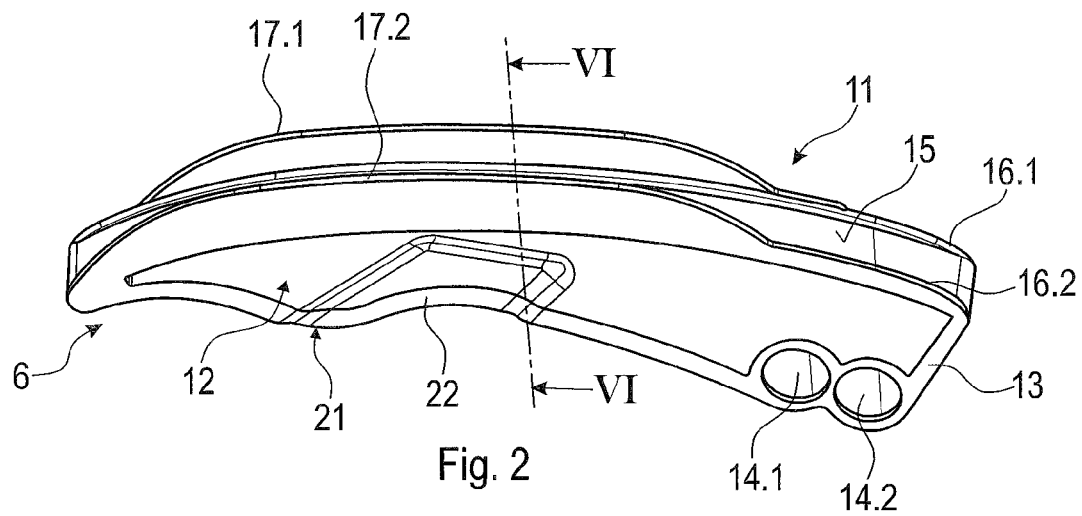
FIG. 2 shows a first embodiment of a tensioning rail according to the invention in a perspective front view.
Figure 3:
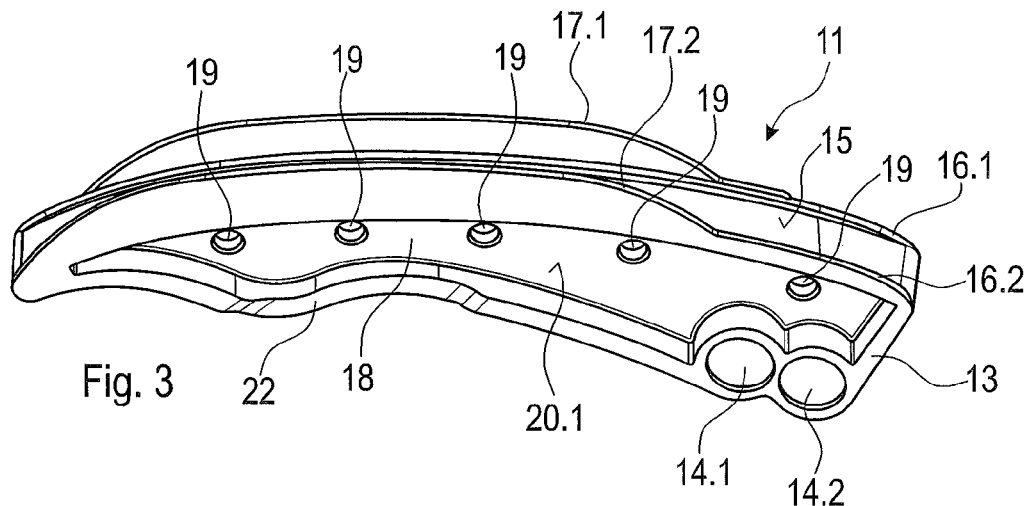
FIG. 3 shows the base body of the tensioning rail of FIG. 2 in a perspective representation.
Figure 4:
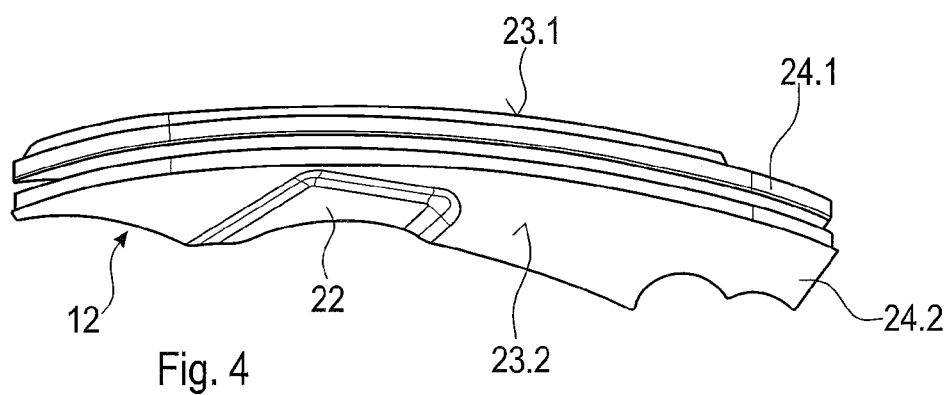
FIG. 4 shows the vibration absorber for the tensioning rail of FIG. 2 in a perspective representation.
Figure 5:
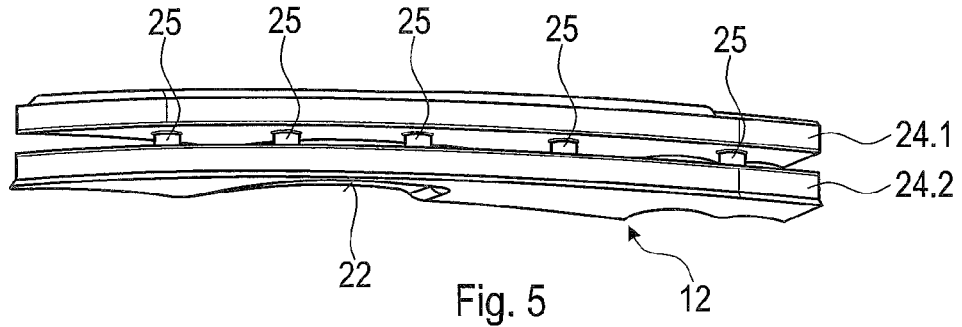
FIG. 5 shows the vibration absorber of FIG. 4 in a perspective top view.
Figure 6:
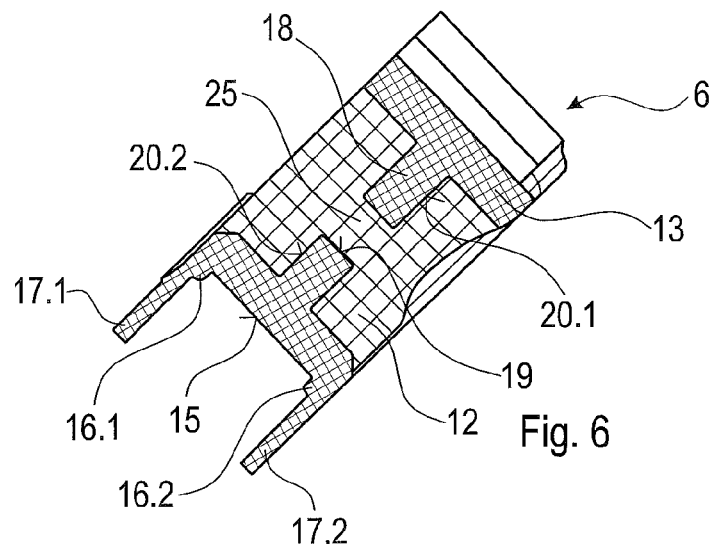
FIG. 6 shows an enlarged sectional view of the tensioning rail of FIG. 2 cut along the line VI-VI.
Figure 7:
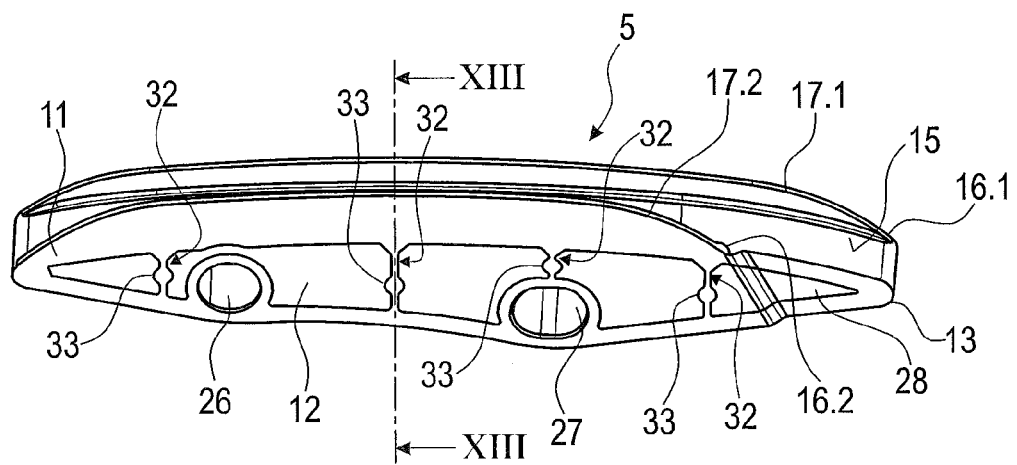
FIG. 7 shows a first embodiment of a guide rail in a perspective front view.
Figure 8:
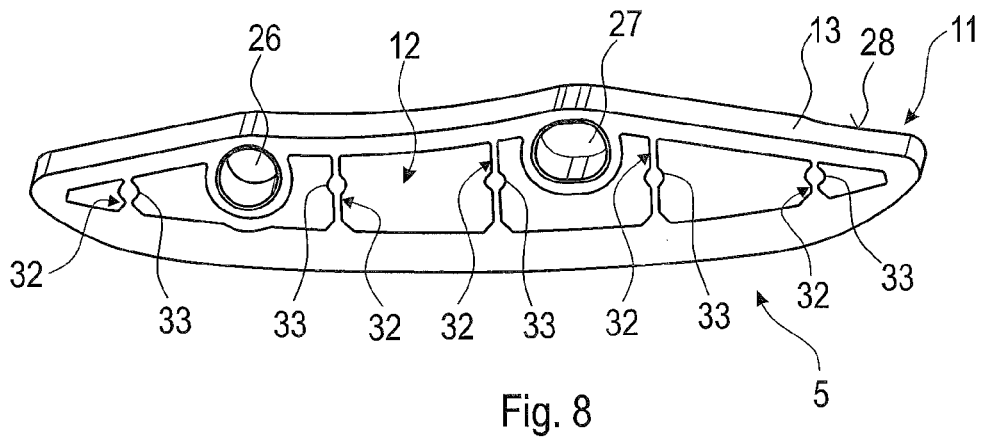
FIG. 8 shows the guide rail of FIG. 7 in a perspective rear view.
Figure 9:
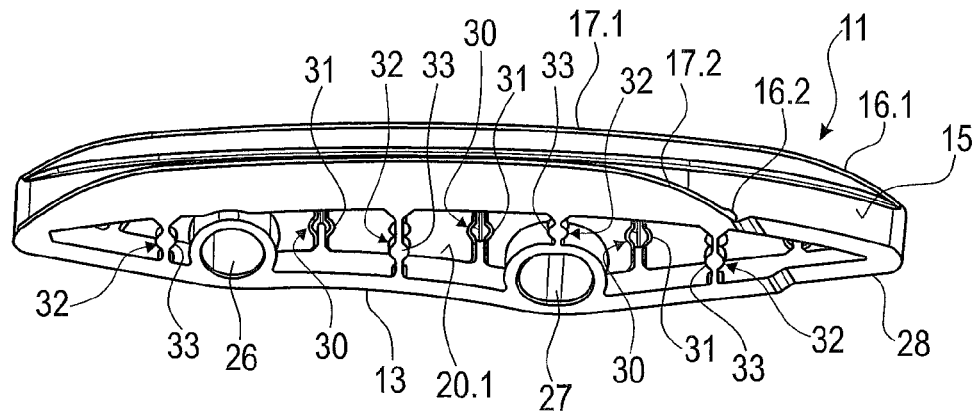
FIG. 9 shows the base body of the guide rail of FIG. 7 in a perspective representation.

FIG. 1 schematically shows a timing chain drive 1 comprising essentially a crank shaft sprocket 2, two overhead camshaft sprockets 3.1 and 3.2, a continuous timing chain 4 wrapped around the sprockets 2, 3.1, 3.2 and a guide rail 5 as well as a tensioning rail 6. The tensioning rail 6 is pivotally mounted at its pivot point 7 and is pressed against the timing chain 4 by a chain tensioner 8 disposed in a portion of the engine housing 9, in that the tensioning piston 10 of the chain tensioner 8 presses against the rear side of the tensioning rail 6.

The guide rail 5 is assigned to the taut side of the timing chain drive 1 and the tensioning rail 6 to the slack side. Such a timing chain drive 1 is a highly dynamic device that needs to withstand, firstly, high rotational speeds and, secondly, also the changing dynamic loads. The components there reach their load limits, for which reason it is important to take a wide variety of measures to dampen or suppress vibrations within the system. In the present case, therefore, both a guide rail 5 as well as a tensioning rail 6 are employed which comprise a suitable damping device.

A first embodiment of a tensioning rail is now described with reference to FIGS. 2 to 6 which can be used in a timing chain drive of FIG. 1. The tensioning rail 6 comprises essentially two main elements, which are, firstly, a base body 11 as being shown by itself in FIG. 3, and, secondly, a vibration absorber 12 as seen by itself in FIGS. 4 and 5.

The base body 11 is a carrier made of plastic material comprising an essentially circular rail frame 13 defining the width of the base body 11 and having approximately a curved triangular shape. In one corner of the rail frame 13, two pivot sleeves 14.1 and 14.2 are arranged adjacently disposed and integrally formed with the latter which can be used for a pivot arrangement of the tensioning rail 6 varying in dependency of the engine model. The curved upper side of the rail frame 13 on its outer side forms a slide track 15 along which the timing chain 4 slides during later use. The slide track 15 comprises lateral guide webs 16.1 and 16.2 guiding the timing chain 4. Sidewalls 17.1 and 17.2 are further provided across a certain area of the slide track 15 beyond the guide webs 16.1 and 16.2. Substantially in the middle of the width of the tensioning rail 6, a central rail wall 18 is disposed within the rail frame 13. The rail wall 18 closes the rail frame 13 except for cylindrical openings 19 arranged spaced apart from each other. The thickness of the rail frame 13 and the thickness of the rail wall 18 are substantially equal. Due to this design of the rail frame 13 and the rail wall 18, recesses 20.1 and 20.2 arise on both sides of the base body 11. Each of these recesses 20.1 and 20.2 is therefore surrounded by the rail frame 13 and closed by the rail wall 18 with the exception of the openings 19 at the bottom. Apart from that, recess 20.1 and 20.2 are open towards the outside.

Furthermore, the tensioning rail 6 comprises a press-on projection 21 at a distance to the pivot sleeves 14.1 and 14.2 onto which the face side of the tensioning piston 10 of the chain tensioner 8 presses during later operation. Due to structural aspects, the illustrated embodiment of the tensioning rail 4 both in the base body 11, i.e. in the lower part of the rail frame 13 (opposite to the slide track 15) comprises a indentation 22 which extends also into the vibration absorber 12.

The base body 11 is in the present case made of polyamide, namely, PA 66 It can also be reinforced (glass or carbon fiber). The slide track 15, however, must act accordingly little abrasive upon the timing chain 4, for which reason a special sliding coat body is frequently with reinforced plastics arranged on the slide track 15 which then exhibits suitable friction reducing properties. When suitable basic material is selected for the base body 11, however, this is not absolutely necessary.

The vibration absorber 12 is formed by a uniform plastic structure. A thermoplastic elastomer on the basis of styrene block copolymers is used as plastic material. In the present case, this is styrene-ethylene-butylene-styrene (SEBS). Materials with the name HX6IMB or HX8ICZ from the company Kraiburg TPE GmbH & Co KG can presently be used. These materials are oil-resistant TPEs and can be used in the engine compartment of an internal combustion engine. They inter alia withstand temperatures up to 150° C.

The entire vibration absorber 12 is produced by an injection-molding process, in which the respective plastic material is injected into at least one of the recesses 20.1 and 20.2, and in this process passes through the openings 19 and, depending on the design of the injection mold, then subsequently fills the oppositely disposed recesses 20.1 or 20.2. The base body 11 can directly beforehand be produced in an adjacent injection mold and then placed as an insert into a further injection mold, so that the only cavities to be filled by the plastic material are recesses 20.1, 20.2 and openings 19. However, there is also the option to perform two-component injection-molding in one and the same tool or in one and the same machine, respectively. It is in particular possible by injection-molding that the outer surface of the rail frame 13 and the outer surfaces of the vibration absorber 12 be designed in a flush manner.

When the vibration absorber 12 is viewed by itself, then it is composed essentially by two plate members 24.1 and 24.2 parallel to each other each filling the recesses 20.1 and 20.2 and cylindrical connecting pins 25 holding them at a distance to each other. The distance between the two plate members 24.1 and 24.2 essentially corresponds to the thickness of the rail wall 18, because the shape of the outer contour of the vibration absorber 12 and the region between the two plate members 24.1 and 24.2 including the cylindrical connection pins 25 is defined by the contour of the base body 11.

The material of the base body 11 and the plastic material of the vibration absorber 12 do not enter into a close connection with each other, so that there is substantially a positive fit between the two and no or hardly any adhesion. This is unusual as thermoplastic elastomers are usually to engage in firm connections with other elements. Due to this fact, the vibration absorber 12 can, depending on the excitation state, vibrate together with the base body 11 or perform a counter vibration that leads to vibration damping. This is supported in particular by non-adhesion. It can be presently advantageous that engine oil from the engine enters in the region between vibration absorber 12 and base body 11 and thereby also has influence on the vibration behavior of the overall system. The internal connection of the vibration absorber 12 is due to the selected plastic material so firm that sufficient durability is given and the essentially only positive-fit connection with the base body 11 is sufficient. A tensioning rail 6 thus constructed can very well be produced using the existing method in which at least portions of the base body 11 are embedded in the plastic material that is introduced in a flowable or pasty state and later forms the vibration absorber 12. The entire inner surface of the rail frame 13 and the rail wall 18 are essentially no longer visible from the outside.

Hereinafter, an embodiment of a guide rail 5 which can be used in a timing chain drive 1 of FIG. 1 is further illustrated with reference to FIGS. 7 to 13.

For reasons of simplicity, the same reference numerals as in the previous embodiment of the tensioning rail 6 are used for same or similar components and the above description is additionally referred to, so that consequently only the essential differences are explained.

In contrast to a tensioning rail 6, a guide rail 5 is not pivotally mounted to the engine block.

The guide rail 5 is naturally not curved as much as the tensioning rail 6, for which reason the base body 11 has a straighter shape. In addition, it does not require any press-on projection. The base body 11 comprises two attachment sleeves 26 and 27 spaced apart from each other in the lower region of the rail frame 13. Attachment sleeve 26 is substantially of cylindrical design and attachment sleeve 27 is oval in order to be able to compensate for a certain amount of thermal expansion. For structural reasons, the guide rail 5 at its one end portion comprises an indentation 28. In this region, there is neither a guide web 16.2 nor a side wall 17.2 provided on the slide track 15. They only begin at the end of the indentation 28 when the full width of the guide rail 5 is provided.

The materials for this guide rail 5 are the same as in the tensioning rail 6 previously described.

Figure 10:
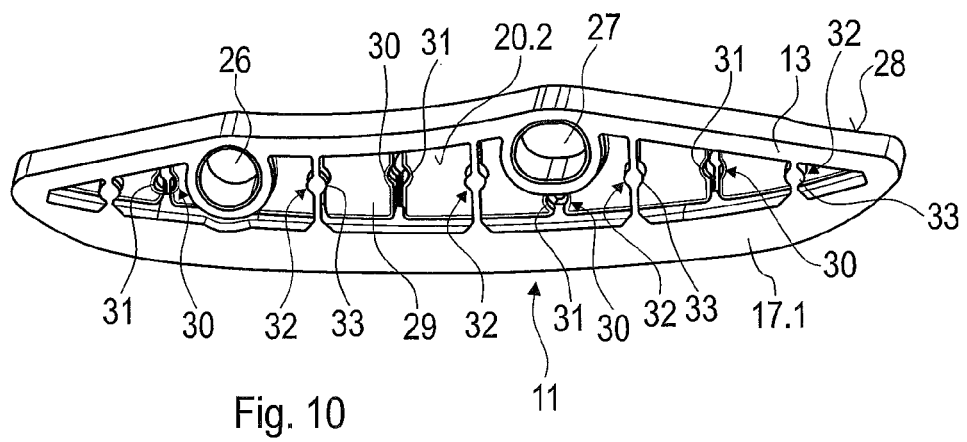
FIG. 10 shows the base body of FIG. 9 in a perspective rear view.
Figure 13:
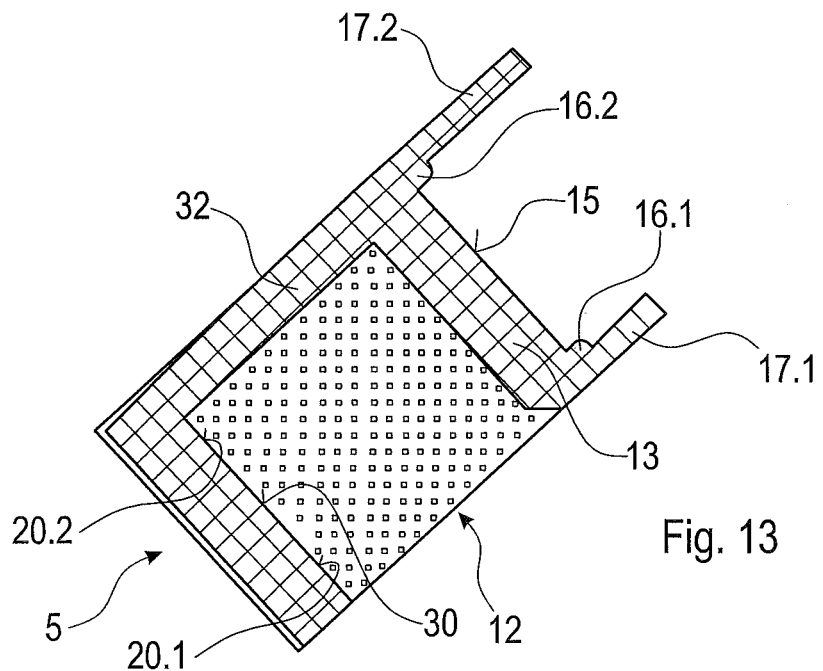
FIG. 13 shows an enlarged sectional view of the guide rail of FIG. 7 cut along the line XIII-XIII.

Furthermore, it is visible in particular from FIGS. 10 and 13, that recess 20.2 on one side comprises a chamfer 29 which when injection-molding the vibration absorber 12 results in a corresponding shape also on the vibration absorber 12.

In contrast to the cylindrical openings in the previous embodiment, slots 30 are provided in the rail wall 18 of the base body 11 extending from side to side substantially perpendicular to the slide track 15 of the rail frame 13 and comprising substantially parallel sides and a cylindrical bulge 31 in approximately the center thereof. A total of nine such slots 30 are provided in the present embodiment partly having different lengths. Spaced from the rail wall 18, bridge webs 32 extend from edge to edge of the rail frame 13 essentially perpendicular to the slide track 15. In the width direction of the guide rail 5, these bridge webs 32 have a predetermined distance to the rail wall 18. The distance corresponds approximately to the thickness of the rail frame 13 or the rail wall 18, respectively. The bridge webs 32 themselves are designed somewhat thinner. Each of the slots 30 is associated with a bridge web 32. The bridge webs 32 have substantially the same shape as the slot 30 being respectively flush therewith. The bridge webs 32 therefore comprise parallel side walls and an approximately central cylindrical thickening 33. The bridge webs 32 are always mutually arranged in oppositely disposed recesses 20.1 and 20.2 so that each slot 30 is always associated with only one bridge web 32. On the one side in recess 20.2 there are therefore five bridge webs 32 and in the oppositely disposed recess 20.1 four of these bridge webs 32.

Figure 11:
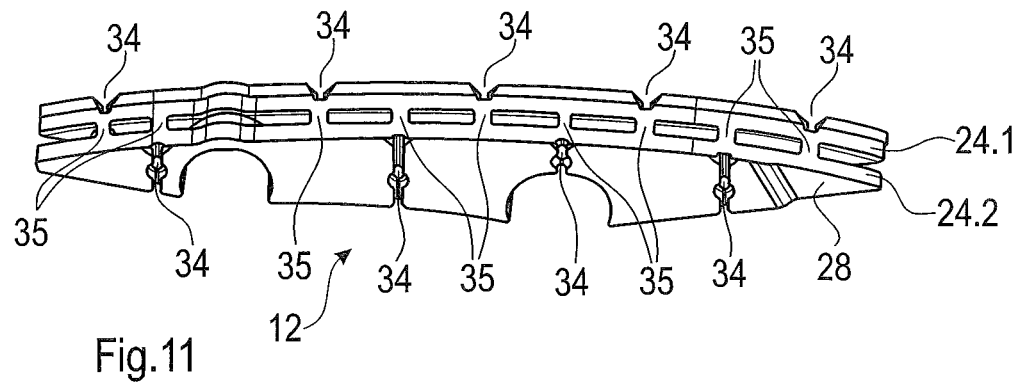
FIG. 11 shows the vibration absorber of the guide rail of FIG. 7 in a perspective front view.
Figure 12:
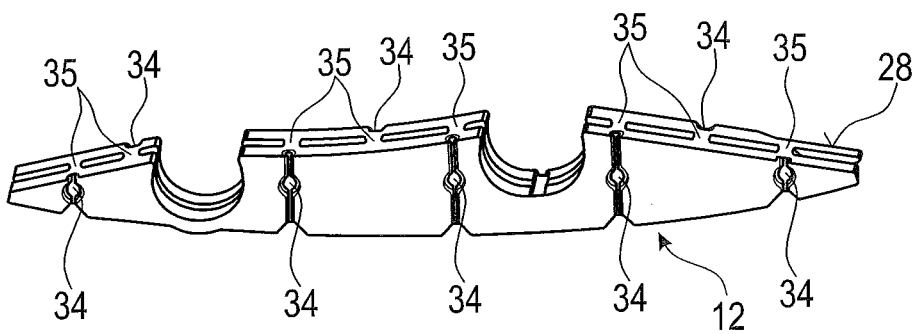
FIG. 12 shows the vibration absorber of FIG. 11 in a perspective rear view.

It can be seen from FIGS. 11 and 12, in which the vibration absorber 12 is shown by itself, how these bridge webs 32, except for their outwardly facing side 5, are embedded in the plastic material of the vibration absorber 12. Due to the type of manufacturing (injection-molding), two plate elements 24.1 and 24.2 are in turn created with respective recesses 34 for receiving the bridge webs 32. The plate elements 24.1 and 24.2 are connected to each other via connecting webs 35 which respectively extend over the associated entire height of the vibration absorber 12. The connecting webs 35 have an outer contour which corresponds to the inner contour of the slots 30. The distance between the two plate elements 24.1 and 24.2 is therefore determined by the thickness of the rail wall 18.

Vibration absorption occurs similarly as described above with respect to the tensioning rail 6. The materials used for production are the same.

Figure 14:
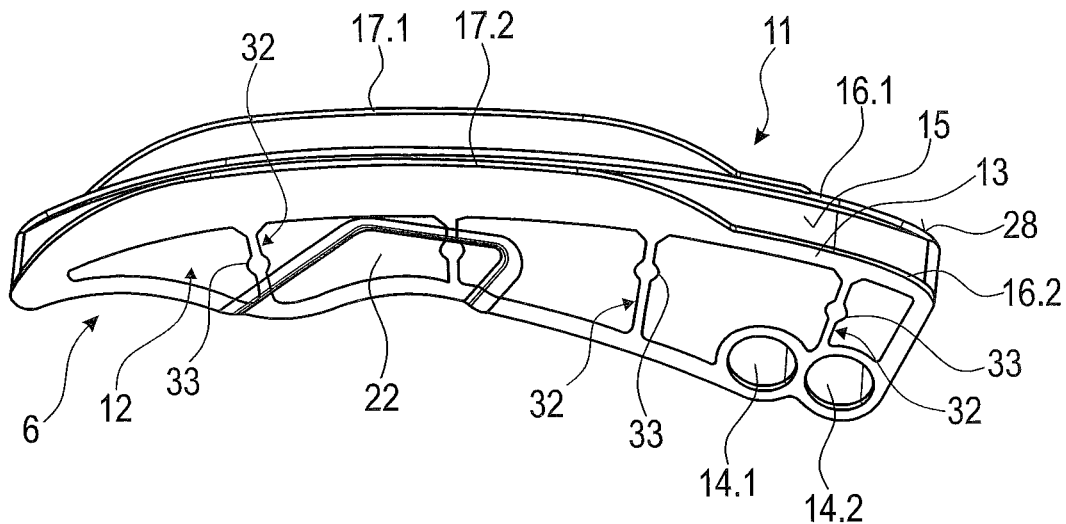
FIG. 14 shows a second embodiment of a tensioning rail in a perspective front view.
Figure 15:
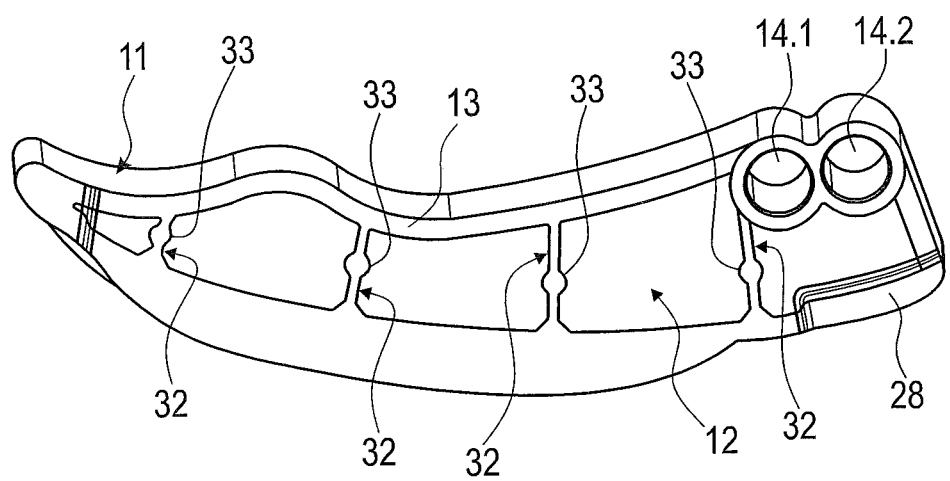
FIG. 15 shows the tensioning rail of FIG. 14 in a perspective rear view.

A second embodiment of a tensioning rail is In the following briefly explained with reference to the FIGS. 14 and 15, which can likewise be used in the timing drive 1 of FIG. 1. For reasons of simplicity, same reference numerals are used as in the previous embodiments where appropriate and where reference can additionally be made to the above description. Accordingly, only the main differences shall be discussed.

The main difference to the embodiment according to FIGS. 1 to 6 is that the rail wall 18 is configured as has been shown for the guide rail according to FIGS. 7 to 13. According thereto, slots 30 and bridge webs 32 are there used as well. Four bridge webs 32 are respectively disposed on both sides laterally offset from one another. Otherwise, the same materials are used.

The associated production method offers the possibility of creating a guide rail 5 or tensioning rail 6, respectively, with a vibration absorber 12 being accommodated substantially exact to shape in corresponding recesses, openings, cavities, etc. of the base body 11. Due to the use of openings 19 or slots 30, undercuts are created which lead to a positive-fit connection of the base body 11 to the vibration absorber 12. Any adhesion of the two elements to each other is irrelevant for the mode of operation. In addition, the material used for the vibration absorber 12 is sufficiently stable to withstand the loads of operation of the internal combustion engine under the influence of engine oil. The shape of the vibration absorber 12 as well as the possible use of fillers and additional weights has significant influence upon the vibration absorption behavior. The vibration absorber does also not need to be configured as an integrally formed element. Instead, several of these structures can be disposed independently of each other on the base body 11.

In addition, it is to be noted that the manufacturing principle described and possibly also the materials used can also be employed for other applications for vibration absorption, in particular in the automotive sector. For example, it is conceivable to also provide a sprocket base body with a respective vibration absorber.

The invention claimed is:

1. A tensioning or guide rail with a base body and a vibration absorber disposed on said base body, wherein said base body comprises a slide track and side faces perpendicular to the slide track, wherein said base body comprises at least one receiving portion in which said vibration absorber is arranged in a positive-fit manner, said at least one receiving portion comprises at least one recess in at least one side face of the base body, said at least one recess is open to the respective side face and filled with at least a portion of the vibration absorber so that a substantial portion of the respective side face of the base body of the tensioning or guide rail is formed by the vibration absorber, and wherein at least portions of said vibration absorber abutting on said base body are made of an injection-molded thermoplastic elastomer.

2. The tensioning or guide rail according to claim 1, wherein said base body comprises a support portion arranged beneath the slide track, where said support portion by itself or together with said slide track forms a rail frame inside which a rail wall, extending substantially perpendicular to said slide track and being recessed relative to said rail frame, is arranged in which or by which connection points are disposed or formed, respectively.

3. The tensioning or guide rail according to claim 2, wherein openings are arranged spaced apart as connection points in said rail wall, which at least in part are each faced by bridge webs extending from one side of said rail frame to the other each at a distance to said rail wall, so that portions of said vibration absorber are disposed between said bridge webs and said rail wall.

4. The tensioning or guide rail according to claim 2, wherein said rail frame is filled with said plastic material of said vibration absorber while entirely or partially embedding said rail wall and/or said bridge webs.

5. The tensioning or guide rail according to claim 1, wherein said plastic material of said vibration absorber is a TPE based on styrene block copolymers.

6. The tensioning or guide rail according to claim 1, wherein said portions of said base body abutting on said vibration absorber are made of plastic material.

7. A continuous drive for an internal combustion engine comprising a drive gear, at least one driven gear, a continuous drive device coupling said drive gear with said at least one driven gear, and a tensioning or guide rail abutting on said continuous drive device according to claim 1.

8. The tensioning or guide rail according to claim 5, wherein said plastic material is styrene-ethylene-butylene-styrene.

9. The tensioning or guide rail according to claim 6, wherein said plastic material is polyamide.

10. The tensioning or guide rail according to claim 9, wherein the polyamide is PA66.

* * * * *